United States Patent
Hsueh et al.

(10) Patent No.: US 9,882,666 B2
(45) Date of Patent: *Jan. 30, 2018

(54) TIME SYNCHRONIZATION FOR NETWORK TESTING EQUIPMENT

(71) Applicant: Viavi Solutions Inc., Milpitas, CA (US)

(72) Inventors: Canning Hsueh, Colorado Springs, CO (US); Michael Stevens, Fountain, CO (US); Bob Samway, Colorado Springs, CO (US)

(73) Assignee: Viavi Solutions Inc., Milpitas, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/822,217

(22) Filed: Aug. 10, 2015

(65) Prior Publication Data

US 2016/0191184 A1 Jun. 30, 2016

Related U.S. Application Data

(63) Continuation of application No. 13/714,174, filed on Dec. 13, 2012, now Pat. No. 9,106,353.

(Continued)

(51) Int. Cl.
*H04J 3/06* (2006.01)
*H04L 29/06* (2006.01)
(Continued)

(52) U.S. Cl.
CPC .......... *H04J 3/0667* (2013.01); *H04J 3/0635* (2013.01); *H04J 3/0682* (2013.01);
(Continued)

(58) Field of Classification Search
CPC ...... H04J 3/0667; H04J 3/0682; H04L 7/0012
See application file for complete search history.

(56) References Cited

U.S. PATENT DOCUMENTS 7,336,673 B2  2/2008  Ilnicki et al.
7,868,780 B2  1/2011  Engel et al.
(Continued)

FOREIGN PATENT DOCUMENTS

EP   2372932 A1   10/2011

OTHER PUBLICATIONS

IEEE Standard 1588TM—2008 "IEEE Standard for a Precision Clock Synchronization Protocol for Networked Measurement and Control Systems", Jul. 24, 2006, 289 pages.
(Continued)

*Primary Examiner* — Hassan Kizou
*Assistant Examiner* — Deepa Belur
(74) *Attorney, Agent, or Firm* — Harrity & Harrity, LLP (57) ABSTRACT

The invention relates to time synchronization between network testing elements in distributed network monitoring and testing systems, and provides a condensed PTP process wherein the number of timing messages exchanged between master and slave in one iteration of the time synchronization process is reduced. Furthermore, timing messages are encrypted to provide for a more secure synchronization process. One aspect of the method provides for an automatic detection and adaptive handling of protocol stacks of received timing packets.

20 Claims, 9 Drawing Sheets

Related U.S. Application Data (60) Provisional application No. 61/569,970, filed on Dec. 13, 2011.

(51) Int. Cl.
  *H04L 7/00* (2006.01)
  *H04L 12/46* (2006.01)

(52) U.S. Cl.
  CPC ........ *H04L 7/0012* (2013.01); *H04L 12/4633* (2013.01); *H04L 63/04* (2013.01); *H04L 63/0428* (2013.01)

(56) References Cited

U.S. PATENT DOCUMENTS

| | | | |
|---|---|---|---|
| 8,462,821 B1 | 6/2013 | Sagarwala et al. | |
| 9,106,353 B2 | 8/2015 | Hsueh et al. | |
| 2009/0109973 A1 | 4/2009 | Ilnicki | |
| 2010/0153742 A1* | 6/2010 | Kuo | H04L 63/04 713/189 |
| 2011/0064091 A1 | 3/2011 | Darras et al. | |
| 2011/0150005 A1* | 6/2011 | Chen | H04J 3/0667 370/503 |
| 2011/0216816 A1* | 9/2011 | Frenzel | H04B 1/38 375/222 |
| 2011/0305150 A1 | 12/2011 | Haver et al. | |
| 2012/0129548 A1* | 5/2012 | Rao | H04W 64/00 455/456.1 |
| 2012/0250519 A1 | 10/2012 | Stevens et al. | |
| 2013/0077642 A1* | 3/2013 | Webb, III | H03L 7/1974 370/503 |
| 2013/0121347 A1 | 5/2013 | Saito et al. | |
| 2013/0145041 A1 | 6/2013 | Ruffini et al. | |
| 2013/0170507 A1* | 7/2013 | Hsueh | H04L 63/0428 370/503 |
| 2013/0182806 A1* | 7/2013 | Obradovic | H04L 7/04 375/356 |
| 2013/0202291 A1* | 8/2013 | Cavaliere | H04B 10/07 398/33 |
| 2013/0215889 A1 | 8/2013 | Zheng et al. | |
| 2013/0227172 A1 | 8/2013 | Zheng et al. | |
| 2013/0336340 A1* | 12/2013 | Ando | H04J 3/0682 370/503 |
| 2014/0064303 A1 | 3/2014 | Aweya et al. | |
| 2014/0269672 A1 | 9/2014 | Zampetti | |
| 2014/0362872 A1 | 12/2014 | Grenabo et al. | |

OTHER PUBLICATIONS

Texas Instruments Application Report SNLA116—May 2009, AN-1963 IEEE 1588 Synchronization over standard networks using the DP83640, 10 pages.

Hirschmann Automation and Control GmbH, White Paper "Precision Clock Synchronization—IEEE 1588", Rev. 1.2, by Andreas Dreher, Dirk Mohl, 20 pages.

John C. Eidson et al, Paper 21 "IEEE-1588™ Standard for a Precision Clock Synchronization Protocol for Networked Measurement and Control Systems", 34th Annual Precise Time and Time Interval (PTTI) Meeting, http://www.pttimeeting.org/archivemeetings/2002papers/paper21.pdf, 2002, pp. 243-254.

* cited by examiner

| Mssg ID 251 | Seq. ID 252 | PTP data/Probe cmd 254 | Cntrl Flags 262 | Automatic Rejection Cntrl 264 |

222

260 brackets Cntrl Flags and Automatic Rejection Cntrl

FIG. 7

| Mssg ID 271 | Seq. ID 272 | PTP data 274 | Net. Diagnostics 282 | Self-Diagnostics 284 |

223

280 brackets Net. Diagnostics and Self-Diagnostics

TIME SYNCHRONIZATION FOR NETWORK TESTING EQUIPMENT

CROSS-REFERENCE TO RELATED APPLICATIONS

This application is a continuation of U.S. patent application Ser. No. 13/714,174, filed Dec. 13, 2012 (now U.S. Pat. No. 9,106,353), which claims priority from U.S. Provisional Patent Application No. 61/569,970 filed Dec. 13, 2011, the disclosures of which are incorporated herein by reference.

TECHNICAL FIELD

The present invention relates generally to networking and communications technology and, more particularly, to time synchronization for distributed network testing equipment.

BACKGROUND OF THE INVENTION

Communications networks often include monitoring and/or testing equipment that is distributed in different parts of the network. Examples of such network monitoring equipment include those described in U.S. Pat. No. 7,336,673 issued Feb. 26, 2008 to Ilnicki et al entitled Creating a Low Bandwidth Channel Within a High Bandwidth Packet Stream, U.S. Pat. No. 7,868,780 issued Jan. 11, 2011 to Engel et al entitled System and Method for Test Probe Management, and United States Patent Application No. 2009/0109973 published Apr. 30, 2009 in the name of Ilnicki, entitled Programmable Passive Probe, which are incorporated herein by reference.

Often various monitoring and testing devices located at different network sites are required to coordinate their operation, so that their internal clocks must be synchronized in time. One possible mechanism for such synchronization is provided by a Precision Time Protocol (PTP) standard, which is a general protocol that was developed to synchronize clocks throughout a computer network. PTP was originally defined in the IEEE 1588-2002 standard, entitled "Standard for a Precision Clock Synchronization Protocol for Networked Measurement and Control Systems" and published in 2002. In 2008 a revised standard, IEEE 1588-2008 was released, also known as PTP Version 2, which is incorporated herein by reference; it is not backwards compatible with the original 2002 version.

An object of this invention is to provide an improved device clock synchronization mechanism which is adapted to large-scale distributed network monitoring and testing systems for communication networks.

SUMMARY OF THE INVENTION

Accordingly, one aspect of present invention provides a method for time synchronization between a master device and a slave device in a network, comprising: a) sending by the master device a Sync message (SyncM) to the slave device, and recording a time instant of Sync message transmission $T_1$; b) recording by the slave device a time instant of SyncM reception $T_2$; c) sending by the slave device to the master device a Delay Request message (DelReqM) at a time instant $T_3$, and recording $T_3$ in memory; d) recording by the master device a time instance of DelReqM reception $T_4$; e) sending by the master device a Follow up Delay response message (FDelRespM) comprising $T_4$ and $T_1$ to the slave device; and, f) computing a slave clock offset 'O' based on $T_1$, T2, $T_3$, and $T_4$.

In one aspect of the present invention, timing messages SyncM, DelReqM and FDelRespM are encrypted prior to transmission over the network.

In one aspect of the present invention the network supports a plurality of encapsulation protocols, and each of the SyncM and the FDelRespM is transmitted by the network in the form of an encapsulated timing packet comprising a stack of one or more encapsulation layers formed in accordance with one or more encapsulation protocols supported by the network, and the slave device performs the steps of: receiving the timing packet; automatically detecting which one or more of the supported encapsulation protocols were used in forming the one or more encapsulation layers of the timing packet, and, stripping the timing packet of one or more headers associated with the identified one or more supported encapsulation protocols. Encapsulation layers for the Del_Req message are adaptively formatted according to the stack detected for the received timing packet comprising SyncM.

One aspect of the present invention provides a method for time synchronization between a master device and a plurality of slave devices spaced in a network monitoring system, which comprises: a) sending by the master device a Sync message to each of the slave devices, and recording a time instant $T_1$ when the Sync message leaves the master device, and time instances $T_2$ when each of the slave devices receives the Sync message; b) sending by each of the slave devices to the master a Delay request (Del_Req) message, and recording time instances T3 at which the Del_Req messages leave the slave devices, and time instances T4 at which the Del_Req messages are received by the master device; c) communicating values of T4 and T1 to the respective slave devices; d) computing at each of the slave devices a slave device clock offset 'O' and a network time delay 'D' based on T1, T2, T3, and T4; e) communicating to the master device the network delay values D computed at each of the slave devices; and, f) outputting one or more of the network delay values D in association with network location identifiers for respective one or more slave devices and the master device to a user of the network monitoring system as network latency values.

BRIEF DESCRIPTION OF THE DRAWINGS

The invention will be described in greater detail with reference to the accompanying drawings which represent preferred embodiments thereof, in which like elements are indicated with like reference numerals, and wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 1:
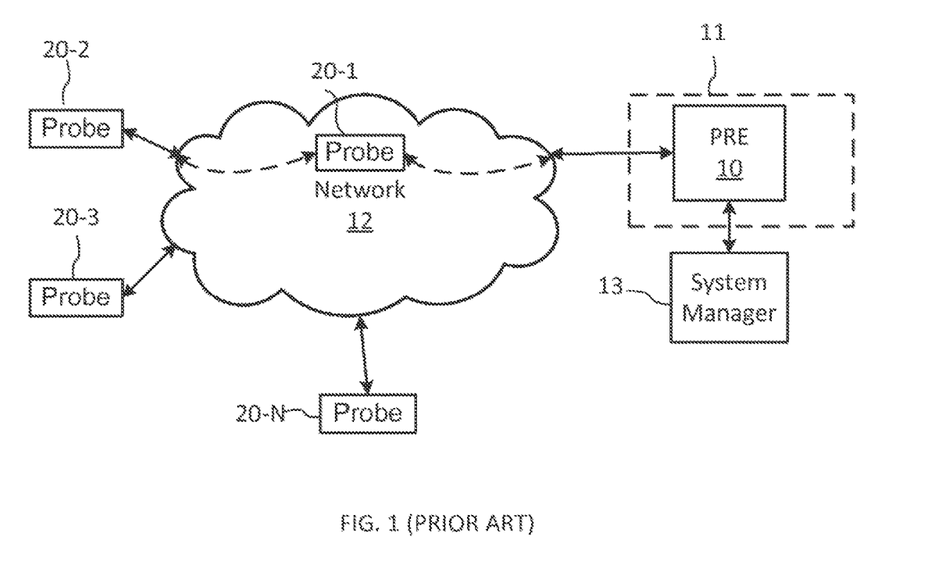
FIG. 1 is a diagram schematically illustrating a distributed monitoring and testing system for a communication network according to prior art.

Note that as used herein, the terms "first", "second" and so forth are not intended to imply sequential ordering, but rather are intended to distinguish one element from another unless explicitly stated. The terms "timing message" and "PTP message" are used herein interchangeably and encompass messages that are exchanged between master and slave devices in the process of timing synchronization between their clocks in accordance with a conventional 1588 PTPT process and in accordance with embodiments of the present invention. Similarly, the terms "timing packet" and "PTP packet" are used herein interchangeably and encompass packets carrying timing or PTP messages in accordance with embodiments of the present invention. Furthermore, the following abbreviations may be used:

ASIC Application Specific Integrated Circuit
FPGA Field Programmable Gate Array
UDP User Datagram Protocol
DSP Digital Signal Processor
CPU Central Processing Unit
IP Internet Protocol
MAC Media Access Control
GRE Generic Routing Encapsulation
MPLS Multiprotocol Label Switching
VLAN Virtual Local Area Network With reference to FIG. 1, there is schematically illustrated a network monitoring and testing system (NMTS) 5 having a plurality of spaced apart probes, which are represented in the figure by probes 20-1, 20-2, 20-3 and 20-N, and which will be referred to hereinafter as probes 20. Data from probes 20 are transmitted over network 12 to a data collection sub-system 11, for example in the form of packets. The data collection sub-system 11 may include a packet routing engine (PRE), which in one embodiment provides scalable management and control of probes 20, aggregates and distributes captured traffic to target applications and components, such as those provided with a system manager 13 that is connected to the PRE 10 with a communication link.

One embodiment of the NMTS 5 is the PacketPortal™ system of JDS Uniphase Corp., which is described, for example in "White Paper: How PacketPortal Works", 2012 JDSU Corp, which is available from JDS Uniphase website "http://www.jdsu.com/en-us/Test-and-Measurement/Products/details/Pages/packetportal-literature.aspx", and which is incorporated herein by reference. In this embodiment, the probes 20 may be in the form of SFProbe™ of JDSU PacketPortal™, which are described in "White Paper: The PacketPortal-Enabled SFProbe and How it Differs from a Standard SFP Transceiver", which is available from the same JDSU website and which is incorporated herein by reference. The PacketPortal™ uses SFProbes as intelligent packet director (IPD) transceivers to collect packets from Gigabit Ethernet networks. They can be distributed anywhere where standard SFP transceivers are used, including at access, edge and core routers of the network, allowing network operators and managers to access packet and data at any point in the network where SFPs are used. In other embodiments, NMTS 5 may be any other distributed network testing system requiring time synchronization between network testing elements.

Since the probes 20 and the PRE 11 may exchange time-sensitive information, the internal clocks of the probes 20 should be synchronized to an internal clock of the PRE 10. One possible way to perform this synchronization is to use the PTP synchronization process that is defined in the IEEE-1588 Standards, so as to synchronize the internal clocks of each probe 20 to the internal clock of the PRE 11. The IEEE-1588 Standard defines procedures for establishing which of the clocks in a system will play the role of a 'master' clock and which of the clocks will be 'slaves', and defines a process for synchronizing the slave clocks to the master clock. In the context of the network monitoring system 5 composed of network testing elements 10, 20 such as that shown in FIG. 1, master-slave clock relationships are usually implicitly known. For example, in the JDSU Packet Portal™ solution the PRE 10 may provide the master clock and the probe 20 may implement the slave clock. Accordingly, in the following in the context of timing and clock synchronization the PRE 10 will also be referred to as the master device 10 or simply as master 10, and the probes 20—as the slave devices 20 or simply as slaves 20. The internal clock of PRE 10 will be referred to as the master clock, and the internal clocks of probes 20 will be referred to as slave clocks. One skilled in the art will appreciate however that embodiments of the present invention are also applicable to other systems wherein internal clocks of one or more of 'slave' devices are synchronized to an internal clock of a 'master' device by means of a message exchange therebetween.

Figure 2:
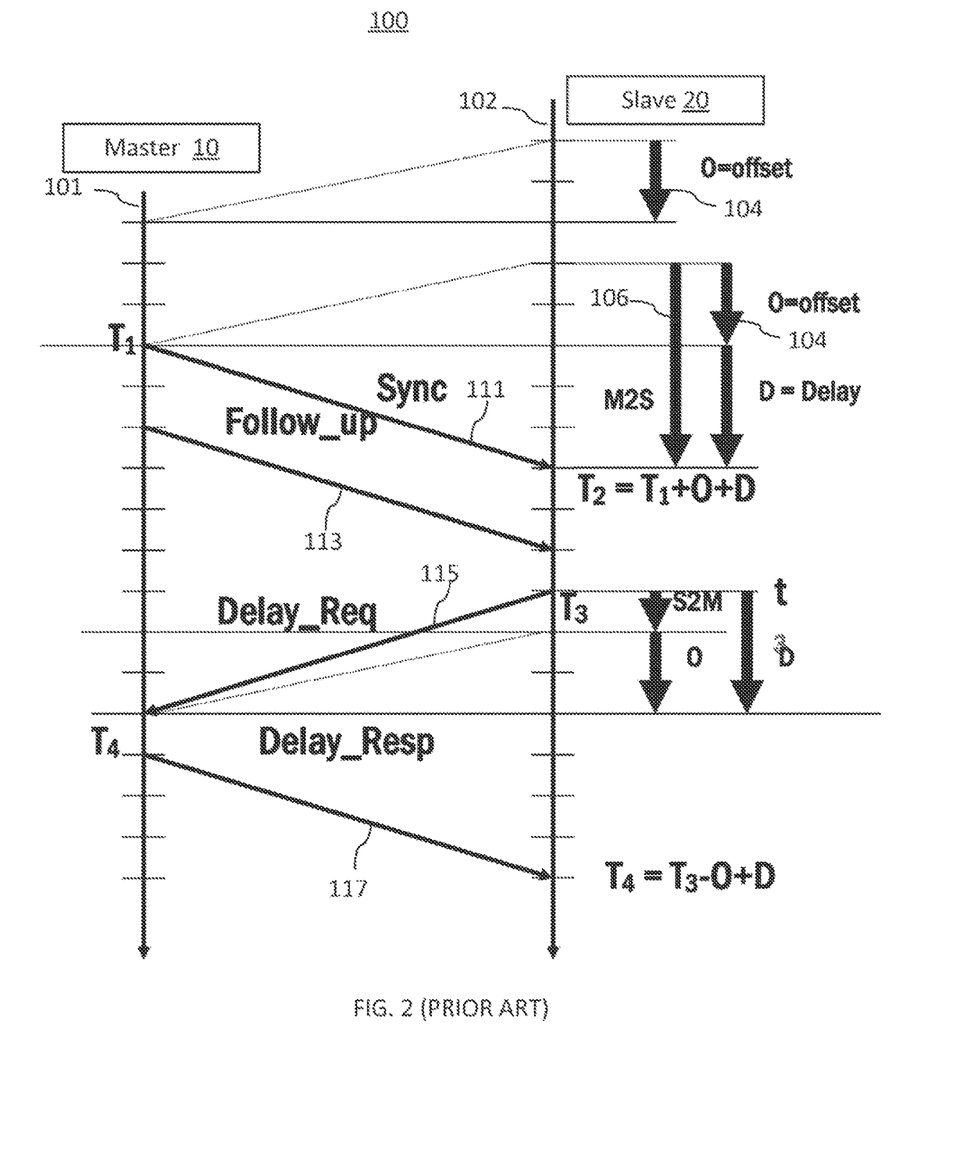
FIG. 2 is a schematic timing diagram illustrating the process of time synchronization according to a conventional PTP synchronization process.

With reference to FIG. 2, there is shown a timing diagram illustrating the conventional PTP process 100 of timing synchronization between a master device including a master clock and a slave device including a slave clock, in accordance with the IEEE 1588 Standard. It may also be referred to hereinafter as the 1588 synchronization process or the conventional PTP process. Here, a vertical line 101 illustrates the timeline of the master clock in the master device 10, while vertical line 102 illustrates the timeline of the slave clock in the slave device 20. Initially there is an unknown time offset O between the respective clocks, as illustrated by arrows 104. The goal of the PTP process is to synchronize the slave clock 20 to the master clock 10 as accurately as possible, so as to minimize the slave offset O 104.

To accomplish this, the conventional PTP process makes use of four messages. The master 10 periodically sends a clear synchronization message—the Sync message (SyncM) 111—to the slave device 20. The send frequency for the Sync message 111 is configurable, e.g. 2 seconds in a basic setting but can be as frequent as once every $\frac{1}{16}$ of a second. The Sync message 111 contains a Sync command and the current time of the master clock 10 at the time of the Sync message formation. However, the time information in the Sync message 111 is not an accurate representation of the exact time when the Sync message leaves the master, since it does not account for delays within the master device such as those associated with the handling of the communication stack and the transmission of the data via the Ethernet controller. Therefore the master 10 records the actual time $T_1$ when the first byte of the Sync message 111 is transmitted out of the network interface card (NIC) port; this information, i.e. $T_1$, is sent to the slave by embedding it in the PTP payload of a second, follow-up message 'Follow_up' 113.

The slave 20 records the time instance $T_2$ when it receives the first byte of the Sync message 111. This time relates to the time $T_1$ as described by the following equation (1):

$$T_2 = T_1 + O + D, \quad (1)$$

where D is the M2S (master to slave) network time delay, also referred to as path delay, i.e. the time that the Sync packet 111 takes to travel from the master to slave.

When the slave receives the Follow Up message 113, it records down $T_1$. Next, slave 20 sends a Delay Request (Del_Req) message (DelReqM) 115 to the master 10, recording the time instance $T_3$ when the Del_Req message 115 is transmitted. When the master 10 receives the Del_Req message 115, it record the time instance $T_4$ when the first byte of the Del_Req message 115 is received by the master's NIC. Finally, the master 10 sends a Delay Response (Del_Resp) message (DelRespM) 117 to the slave, with $T_4$ embedded in the PTP payload thereof. When the slave 20 receives the Del_Resp message 117, it records down $T_4$, which completes the message exchange in one synch period. $T_4$ relates to the time $T_3$ as described by the following equation (1):

$$T_4 = T_3 - O + D, \quad (2)$$

where it is assumed that the slave-to-master (S2M) network delay is equal to the M2S delay denoted as D. Equations (1) and (2) can be easily solved to determine the slave offset O and the network delay D:

$$O = [(T_2 - T_1) - (T_4 - T_3)]/2 \quad (3)$$

$$D = [(T_2 - T_1) + (T_4 - T_3)]/2 \quad (4)$$

The slave then corrects its clock by the computed value of the offset O, so that the slave clock becomes synchronized to the master clock. This completes one synch period. In practice, average values of the offset O obtained over a number of synch periods may be used in a servo control loop for the slave clock.

One drawback of this conventional PTP procedure is that it requires four (4) messages for slave-master synchronization, i.e. to determine the slave time offset O. However, for the purpose of some distributed network testing solutions, such as for example in the Packet Portal™ network testing system of JDSU, too many time-sync packets exchanges can take away valuable user network bandwidth. Furthermore, in large-scale systems wherein one master device, such as PRE 10, can manage thousands of slave devices, such as probes 20, four messages in a sync period of one second forces the PRE to handle thousands of time-sync messages per second, and this can slow down PRE measurement performance.

Accordingly, one aspect of the present invention provides an improved timing synchronization process that reduces the bandwidth usage incurred by the time-sync packets by reducing the number of time synchronization messages in a time-sync period from four to three. An exemplary embodiment of this process will now be generally described with reference to FIGS. 3 and 4, showing a general flowchart of the condensed PTP process 200 in one embodiment thereof and an exemplary timing diagram thereof.

Figure 3:
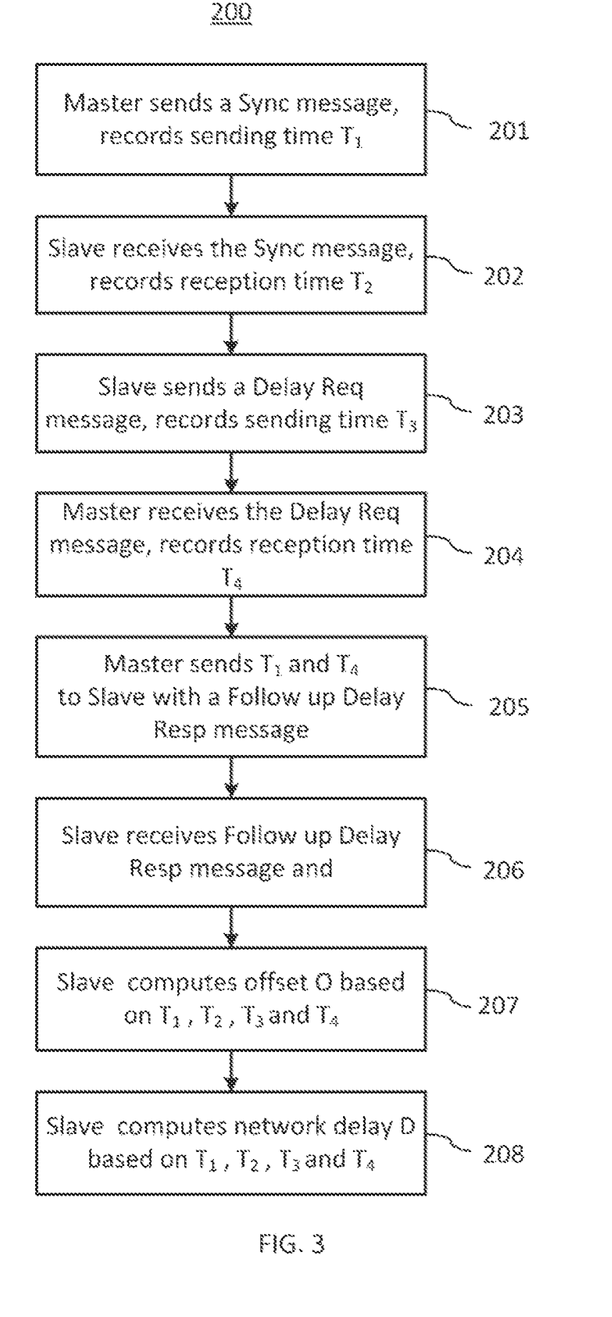
FIG. 3 is a flowchart of a condensed PTP synchronization process according to an embodiment of the present invention.
Figure 4:
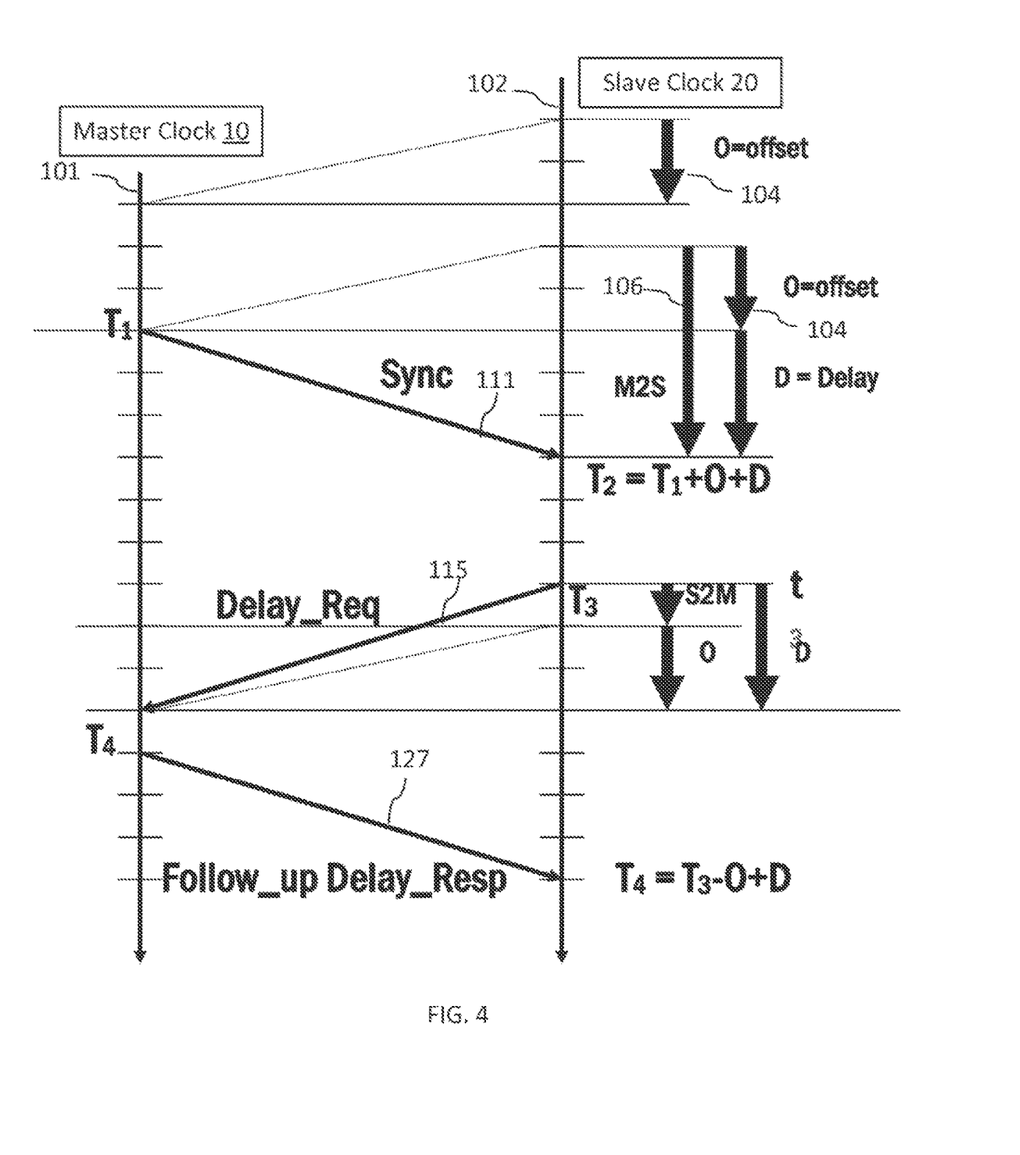
FIG. 4 is a schematic timing diagram illustrating the process of time synchronization according to the condensed PTP synchronization process of FIG. 3.

Referring to FIGS. 3 and 4, similarly to the conventional PTP process, one synchronization period of the condensed PTP process 200, in accordance with an embodiment of the present invention, starts at step 201 wherein the master device 10 sends a Sync message 111 to the slave 20, and records the actual Sync sending time $T_1$ when the first byte of the Sync message 111 is transmitted out of the NIC port. However, in difference with the conventional PTP process 100, no 'Follow_up' message 113 with $T_1$ is sent to the slave at this point; instead, $T_1$ is simply saved in memory at the master 10.

At step 202, slave 20 receives the Sync message 111, and records the time instance $T_2$ of the Sync message reception in its memory. Next, at step 203 slave 20 sends a Delay Request message 'Del_Req' 115 to the master 10, recording the time instance $T_3$ when the Del_Req message 115 is transmitted. When the master 10 receives the Del_Req message 115 at step 204, it record the time instance $T_4$ when the first byte of the Del_Req message 115 is received by the master's NIC. Finally, at step 205 master 10 sends a Follow_up Delay_Response (FDelResp) message (FDelRespM) 127 to the slave, with both $T_4$ and $T_1$ embedded in the PTP payload thereof. At step 206 the slave receives FDelResp message 127 and records down $T_4$ and $T_1$ in memory; this completes the message exchange in one synch period, which is also referred herein as one iteration or one signaling sequence 200, of the condensed clock synchronization process according to an embodiment of the present invention. At this point the slave 20 has all four time instances $T_1$, $T_2$, $T_3$, $T_4$, which enables it to compute at step 207 the time offset O of the slave clock, for example based on equation (3) or a variant thereof, and to adjust the slave clock accordingly to compensate for this offset. Optionally, at step 208 the slave 20 may also compute the network delay time D based on equation (4) or a variant thereof. In one embodiment, the timing message exchange sequence 200 is repeated at desired time intervals, and the computed offset values O are used by a servo control loop for the slave clock which seeks to minimize the slave clock offset relative to the master over time.

In one embodiment of the invention, for example where the master device is PRE 10, the master may use a suitable output device to present to a user of the NMTS 5 information related to a timing synchronization state of the slave device, such as a time-sync status summary for any selected probe 20 associated with PRE 10, for example as follows:

RED Status—The slave clock never locks with the master clock.

Yellow Status—The slave clock locks with the master clock but the time offset O between the clocks is equal or greater than a preset threshold.

Green Status—The slave clock locks with the master clock and the time offset O between the clocks is smaller than a preset threshold.

In one embodiment, the mechanism of determining the time-sync status may be implemented in such a way that a preset threshold is compared to a running-average of the offset O value.

Advantageously, by transmitting both $T_1$ and $T_4$ values within the payload of a single message 127, the aforedescribed process reduces the number of PTP messages transmitted in each sync period by one, thereby reducing the bandwidth load on the network.

Furthermore, embodiments of the present invention may provide further beneficial improvements to the conventional PTP process of the IEEE-1588 Standard. In one embodiment, the security of the network monitoring and testing system 5 is improved by adding PTP packet payload encryption to the PTP process. Since network testing elements, such as for example probes 20 and PRE 10 of the network monitoring and testing system 5, can be distributed and embedded in large numbers in various parts of the user network 12, security of the testing system 5 as a whole is often of utmost importance. However, the IEEE-1588 standard currently does not include any encryption for security. If for example the time synchronization between the probes 20 and the PRE 10 in the NMTS 5 is achieved through the conventional PTP mechanism without data encryption, a hacker can easily cause the PRE-probe time-sync mechanism to malfunction, resulting in no time synchronization or erroneous time-synchronization. The hacker could also disrupt other probe functions, for example by injecting massive numbers of IEEE-1588 Sync and Follow Up messages.

Accordingly, one embodiment of the invention adds an encryption/decryption mechanism to the condensed PTP process 200. In this embodiment, PTP messages 111, 115, and 127 exchanged between network testing elements 10, 20 are encrypted at the source, e.g. PRE 10 or probe 20, and decrypted at the destination, e.g. at probe 20 or PRE 10, respectively. As one skilled in the art would appreciate, a similar encryption mechanism could also be added to the conventional PTP process as illustrated in the timing diagram of FIG. 2.

Figure 5:
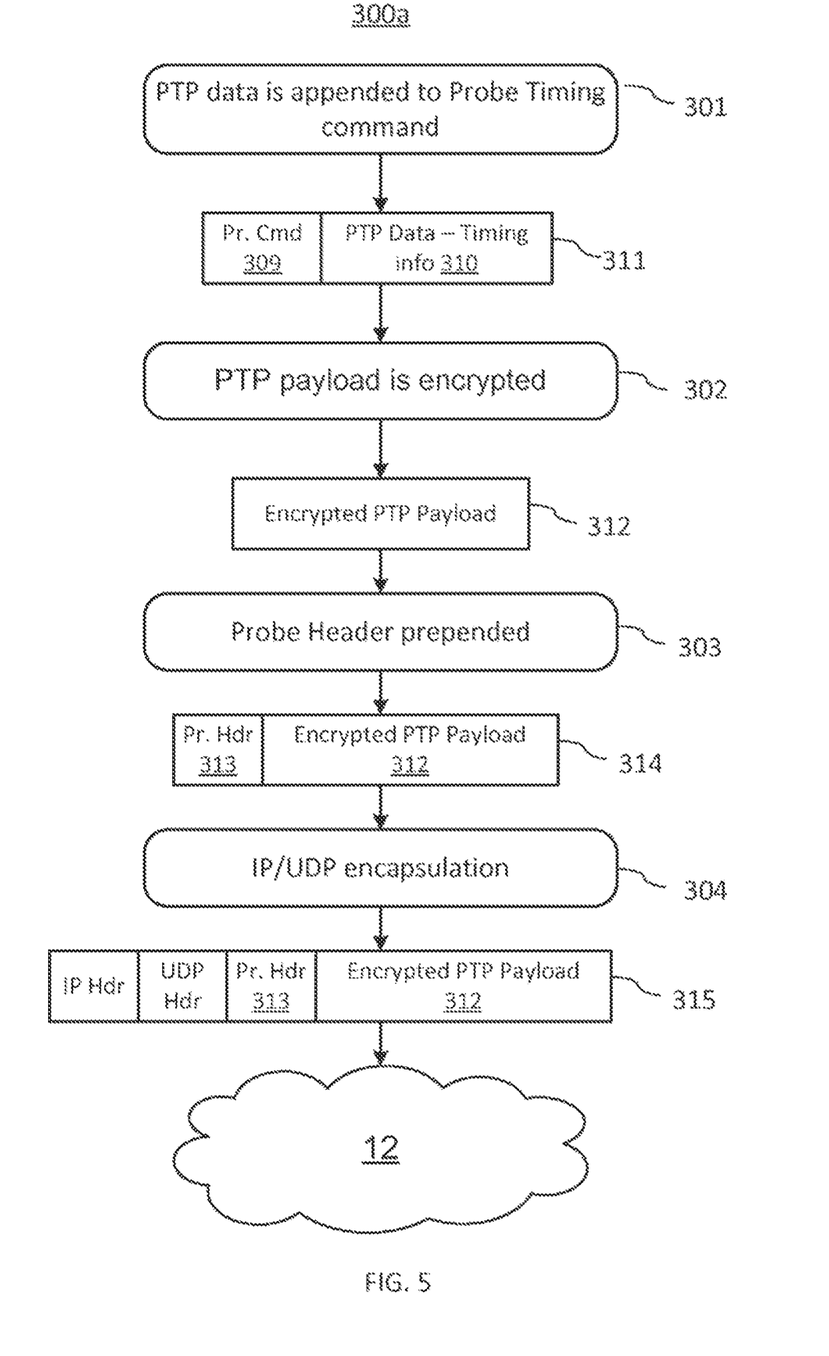
FIG. 5 is a flowchart illustrating a process of timing packet formation at a master device in according to an embodiment of the present invention.
Figure 6:
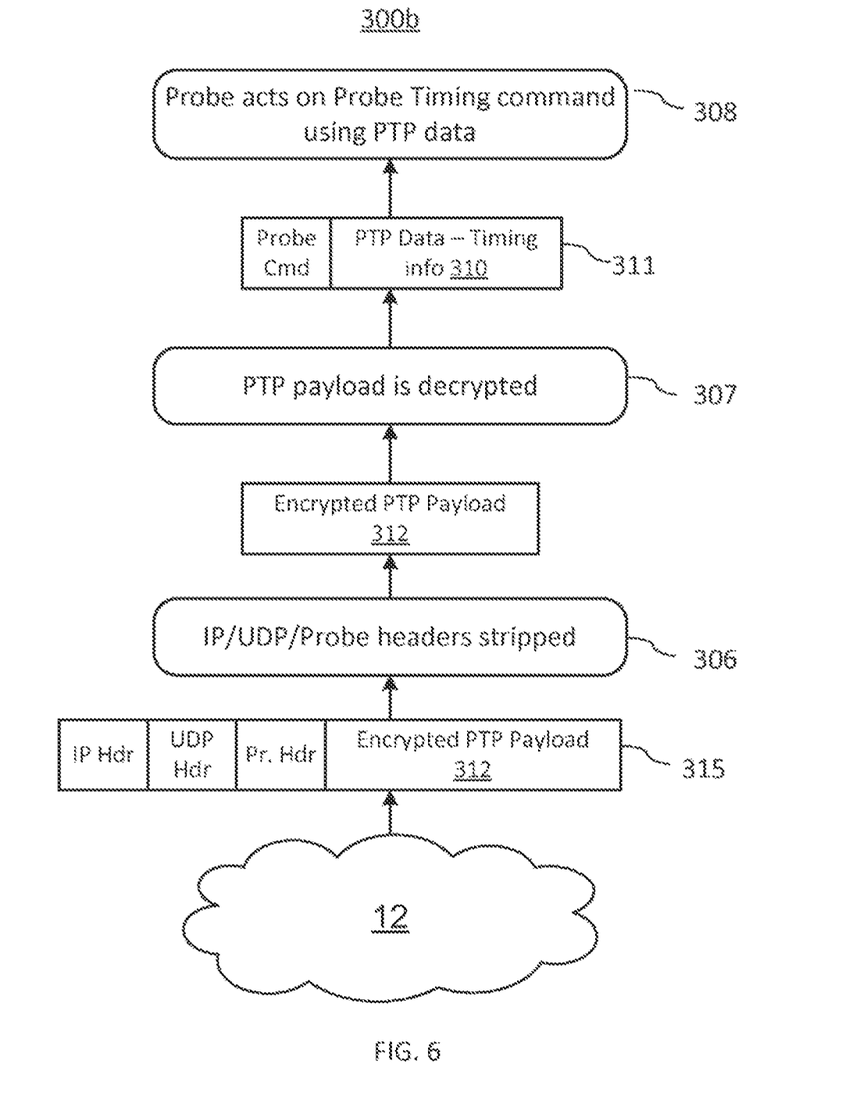
FIG. 6 is a flowchart illustrating processing of the timing packet at a slave device.

In one embodiment of the invention the condensed PTP process is executed generally as illustrated in FIGS. 5 and 6. Referring first to FIG. 5, the process 300a of generation of a PTP message at, for example, PRE 10 may start at step 301 by generating PTP payload data 311. This may include, for example, appending PTP data 310, such as timing information $T_1$ and $T_4$, to a probe timing command 309. The probe timing command 309 may be used by the probe 20 to differentiate PTP, or timing, messages from other PRE-probe messages. In one embodiment, all M2S PTP timing messages 111, 127 may have the same probe command ID, which differentiate them from other commands exchanged between the PRE and the probe. In one embodiment, the PTP payload may include subcommands to further differentiate between Sync, Del_Req or Follow_UpDelay_Resp messages; by way of an example, '0x00' in a specific field of the PTP packet payload 311 may identify that the message is the PTP Sync message 111. At step 302 the PTP payload 311 is encrypted using a suitable encryption algorithm, for example Grain-128, to generate encrypted PTP payload 312. Other suitable encryption algorithms which provide a desired level of security, are sufficiently fast, and preferably lend itself to implementation in hardware (HW) could also be used at this step, such as but not limited to RC4, GCM (Galois/Counter Mode), CCM (Counter with CBC-MAC), EAX and OCB (Offset Codebook Mode). Next, at step 303 a Probe Header 313 is added to the encrypted PTP payload 312. The Probe Header 313 may include, for example, an identifier of a target probe 20, message sequence numbers, etc. At step 304, suitable IP and UDP headers are added to the resulting encrypted PTP datagram 314 to obtain a PTP packet 315, which is then transmitted over the user network 12 to a target probe or probes 20. Note that the user network 12 may add additional encapsulation levels to the PTP packet 315, for example using such protocols as MPLS, VLAN, GRE, Ethernet etc., as will be further described hereinbelow.

Turning now to FIG. 6, there is schematically illustrated the processing 300b of the PTP packet 315 at a target network testing element, such as a probe 20. Once the PTP packet 315 is received at the probe 20, and optionally stripped off other protocol headers that could have been added by the network 12, at step 306 the packet 315 is passed through an IP/PDP protocol stack where it is stripped off its IP, UDP and Probe headers, producing at the output the encrypted PTP payload 312. At step 307, the encrypted PTP payload 312 is decrypted, for example again using Grain-128, to extract the PTP payload data 311. The content of the Probe header 313 may be checked to verify that the packet 315 is indeed a PTP packet designated to the receiving probe. At step 308, the probe 20 acts on Probe Timing Command using the PTP timing information 310. By way of example, if the PTP timing information contains values of $T_1$ and $T_4$, the probe 20 may compute its clock offset O and update its clock timing to eliminate the offset as described hereinabove.

The process of PTP packet generation and handling that is illustrated in FIGS. 5 and 6 has been described hereinabove with reference to the PTP packets generation at the master device such as PRE 20 and its reception at a slave device such as probe 20, and is directly applicable to PTP packets containing Sync and Follow_up_Delay_Resp messages. However, one skilled in the art would appreciate that substantially the same processing is applicable to the generation and reception of the Delay_Req message 115, which is transmitted from the slave to the master.

According to yet another aspect of the present invention, the PTP packets of the aforedescribed condensed PTP sync process incorporate additional fields for 'piggy-backing' additional network-related or test system-related information such as network diagnostic and instrument self-diagnostic information, and device configuration information.

Figure 7:
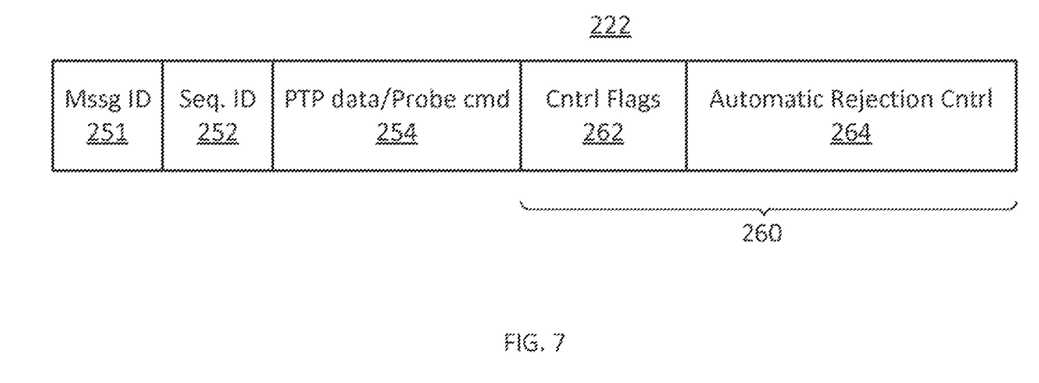
FIG. 7 is a schematic diagram illustrating a master-generated timing packet carrying control and/or configuration data to a slave device.

With reference to FIG. 7, there is schematically illustrated an exemplary content of a timing message 222 that is sent from PRE 10, or the master device, to probe 20, or the slave device, according to an embodiment of the present invention. The timing message 222 may be, for example, the Sync message (SyncM) 111. In the illustrated exemplary embodiment, timing message 222 includes a message ID block 251, a sequence ID block 252, a PTP data/Probe command block 254, and a configuration information block (CIB) 260, which may be formatted in different ways but in the shown exemplary embodiment includes control flags block 262 and an automatic rejection control block (ARCB) 264.

The content of the Message ID block 251 defines the type of the message, and is used at the destination device to determine whether and how to respond to the message. Message ID may tell the receiving device that the message is a command for the probe. The Sequence ID block 252 contains a sequence number that is utilized to verify that the proper PTP signaling sequence is being utilized. The PRE maintains and generates this number. The same number used in the Sync message 111 is also used in the Follow Up Delay Resp message 127 within the same sync period. The sequence number is compared to the previous sequence number to ensure that the defined order is being maintained. The PTP data/Probe command block 245 may include for example such PTP related data as a message origin time stamp as provided by PRE 10 at the time of the message creation. If the timing message 222 is the Follow_UpDel_Resp message 127, block 245 includes $T_1$ and $T_4$ values.

The content of CIB 420 conveys configuration information from master to slave, or in the case of the NMTS 5 from PRE 10 to probe 20. By way of example, it may convey information how the probe 20 should process the incoming timing packets with Sync and Follow_UpDel_Resp messages 127 in the presence of network jitter. Specific values of one control flag may define the width of a lock region for the slave clock, i.e. a maximum calculated value of the slave time offset O when the slave clock is considered to be 'locked' to the master. Here, 'control flag' means specific bits in the timing message 222. Specific values of another control flag may define whether or not certain parameters of the clock controller, or servo, at the probe should be modified. In one embodiment, this flag may direct the servo to select between a set of predetermined specific conditions when a received Sync message should be rejected. By way of example, bit values at a specific bit positions in the SyncM 111 may direct the probe's servo to select between a Light Rejection mode, a Medium Rejection mode, and a Heavy Rejection mode. The Light Rejection mode may be used, for example, for a network where the network traffic is "smooth" but could change between regions of "steadiness", i.e. when the M2S and/or S2M delay through the network is steady and smooth for relatively long periods of time, but may occasionally change and settle to a new value, in which case the transition should be quickly followed by the servo. The Medium and High Rejection modes are used when the network traffic is expected to be bursty, so that the M2S and S2M delay value changes considerably, and the larger values may be considerably greater than the average. In these modes the "long term" average M2S or S2M delay is not expected to change significantly, and when it does, the servo at the probe is allowed to take longer to respond.

The content of ARCB 264 defines parameters of a message rejection algorithm run by the probe 20. The goal of this algorithm is to reject outliers of timing information carried by certain Sync and FollowUpDelayResp packets. In one embodiment, specific bits in this block may define the size of a hardware rejection region, which defines how close the currently calculated M2S and S2M delay values are to historical averages; it is used by the servo to reject outliers that might skew the more typical average values when calculating the averages. In one embodiment, specific bits in this block may define the maximum number of consecutive rejections allowed before a value is used to adjust the timing irrespective of passing or failing the rejection test. In one embodiment, specific bits in this block may define when the rejection conditions are reset automatically by the probe. A corresponding function of the servo counts the number of rejected and accepted delay values in a + and − operation, respectively. When the collective count of rejections reaches a per-defined value that is selected in dependence of the value of the corresponding flag in the SyncM 111, the rejection function in servo is reset automatically. Effectively this disables the rejection algorithm until a Control Flags Rejection Enable value is reached again. This operation protects the device for excessive oscillation due to the rejection algorithm.

Figure 8:
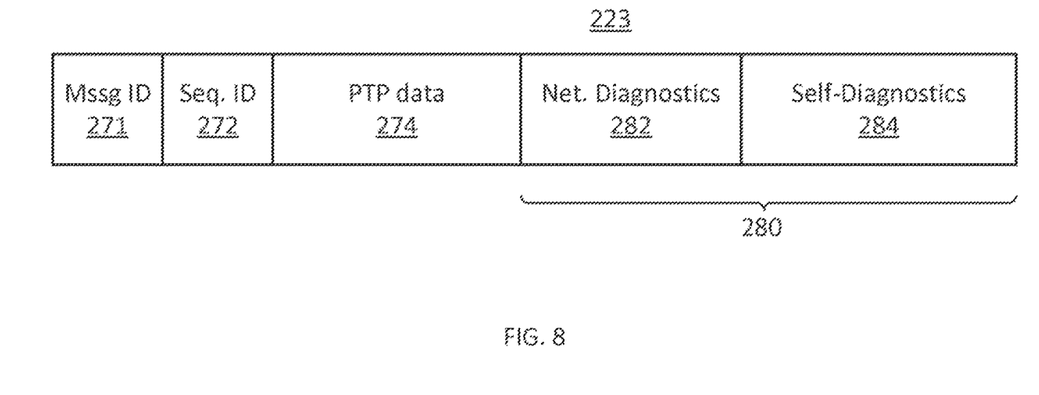
FIG. 8 is a schematic diagram illustrating a slave-generated timing packet carrying diagnostic data to a master device.

Referring now to FIG. 8, there is schematically illustrated an exemplary content of a timing message 223 that is sent from the probe to PRE, such as the Delay Request (Del_Req) message (Del_ReqM) 113, according to an embodiment of the present invention. Generally, the timing message 223 may include, in addition to relevant PTP data, relevant diagnostic information such as network diagnostic and/or probe self-diagnostic information. In the shown illustrative embodiment, timing message 223 includes a message ID block 271, a sequence ID block 272, a PTP data block 274, and diagnostics block (DB) 280 that includes a network diagnostics information block (NDIB) 282 and a self-diagnostics information block (SDIB) 284. In one embodiment, NDIB 282 includes a calculated value of the network delay D). In one embodiment NDIB 282 includes a calculated value of a PRE to probe, or M2S, delay and a calculated value of the probe to PRE, or S2M, delay. This values can be calculated by probe 20, for example, by using predetermined correction values to the 'symmetric' network path delay D. In one embodiment, these correction values can be communicated from PRE 10 to the probe 20 in the PTP data block of the Sync message 111.

SDIB 284 may include a 'lock' flag indicating whether the probe clock is considered to be locked to the PRE clock, Sync command arrival time $T_2$, values of $T_1$, $T_2$, $T_3$, $T_4$ used in the servo operation based on timing info obtained in previous sync periods, and calculated probe timing offset O. In one embodiment, SDIB 286 includes Sync to Sync Count value, which represents a time count between the last 2 Sync timing commands. In one embodiment, SDIB 286 includes Del_Req to Del_Req count value, which represents a time count between reception of the last two Delay Request timing messages 115. In one embodiment the time count corresponds to time measured in 16 ns interval, so that for example hex 3B9ACA0=62500000 counts corresponds to 62500000×16 ns=1 sec between the last two sync commands seen at the probe, or between the last two Del_Req messages generated by the probe.

Advantageously, the transmission of the diagnostic information from the probe 20 to PRE 10 in the body of the PTP timing messages enables the PRE to collect important network and probe-related diagnostic information with a minimum impact on network traffic. For example, providing values of the slave clock offset O and of $T_1, \ldots, T_4$ parameters as used by the slave servo to the master enables the master device, or the user thereof, to evaluate how well the slave device is adjusting its clock, and provides important feedback as to the timing data the slave device is using to adjust its clock.

Figure 9:
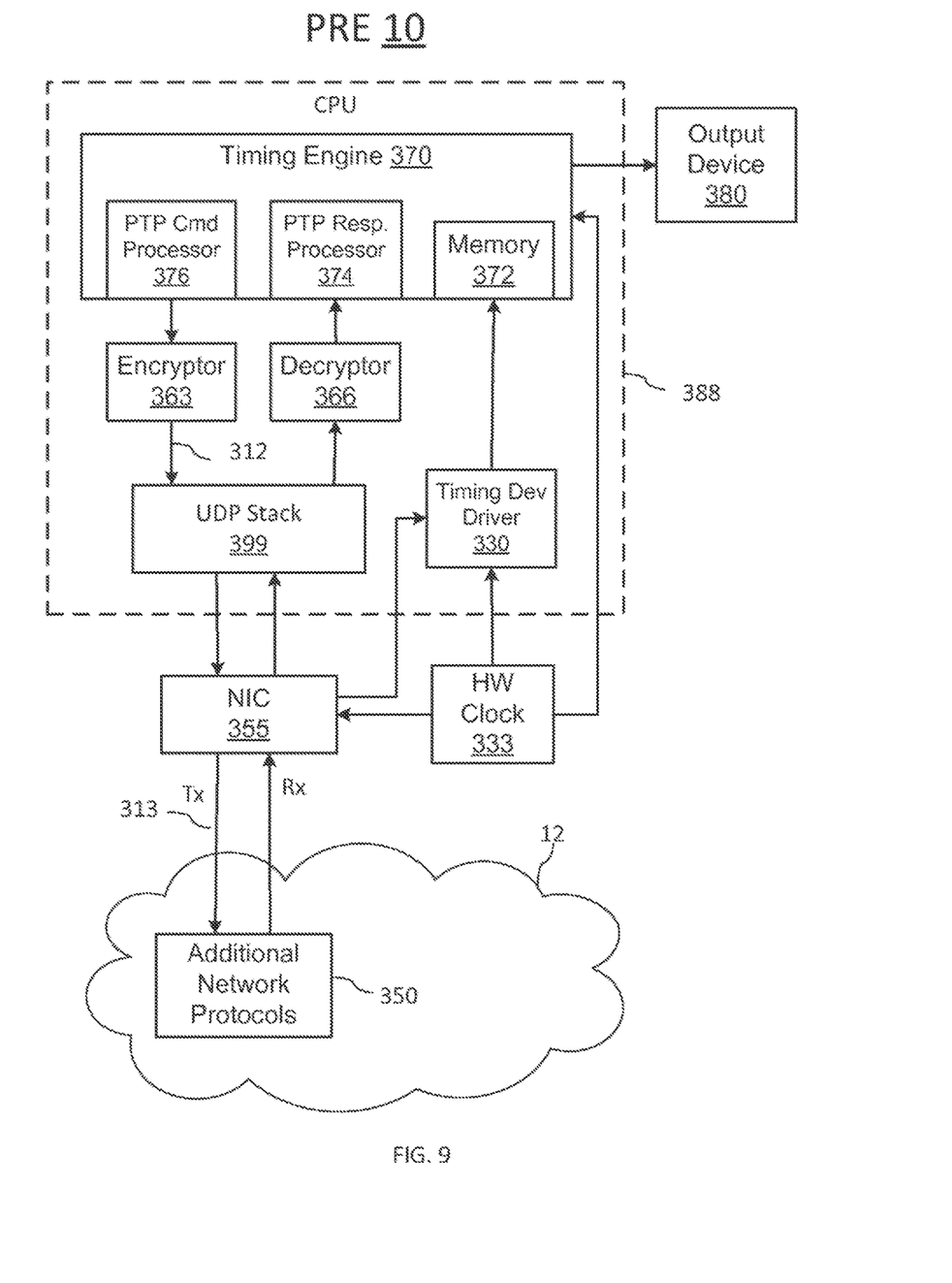
FIG. 9 is a schematic block diagram of a timing synchronization sub-system of a master device.
Figure 10:
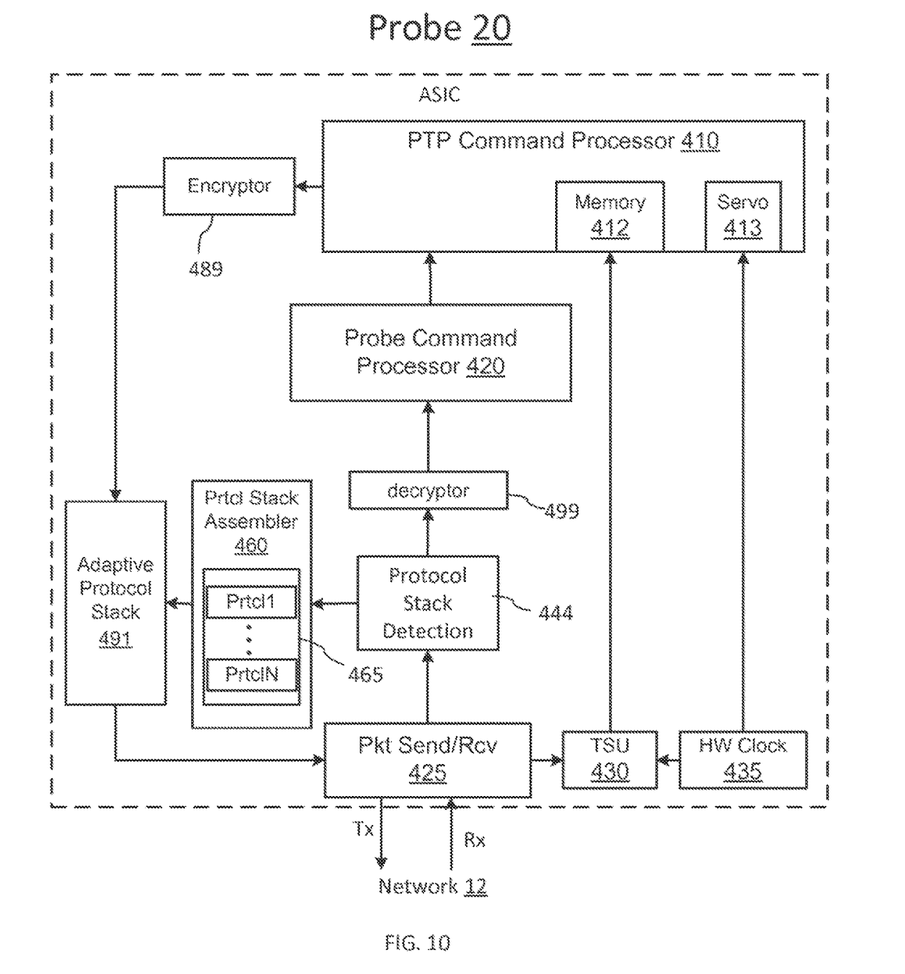
FIG. 10 is a schematic block diagram of a timing synchronization sub-system of a slave device.

Exemplary embodiments of the master device 10 and the slave device 20 that are configured fir implementing at least some of the aspects and features of the present invention described hereinabove are illustrated in FIGS. 9 and 10. Note that blocks shown in these figures are functional blocks that can be embodied using a combination of software and digital processing hardware, or using dedicated hardware logic as known in the art.

Turning first to FIG. 9, there is illustrated a timing synchronization sub-system of PRE 10 in accordance with an embodiment of the present invention. Various implementation of PRE 10 may include other features and functionalities related to its operation as a device for packet collection, processing and/or routing packets directed thereto by the probes 20 in the process of their operation as network testing and monitoring elements; various such features and functionalities are known in the art and are not described hereinbelow. In the context of timing synchronization within NMTS 5, PRE 10 operates as the master device and will also be referred herein below as the master 10. In the illustrated embodiment, PRE 10 includes a network interface card (NIC) 355 coupled to a digital processor 388, which is programmed or otherwise configured to implement various steps of the methods of the present invention described hereinabove with reference to FIGS. 3, 5 and 6. The digital processor 388 may be, for example, a central processing unit (CPU) of a suitable computing device, such as fir example a personal computer or a server computer, and may incorporate one or more computer-readable memory devices. Generally it can be embodied using a single hardware processor or multiple hardware processors. The term hardware processor as used herein encompasses general purpose processors, digital signal processors (DSP), microcontrollers, ASIC, FPGA, etc.

Continuing to refer to FIG. 9, NIC 355 connects to a protocol stack 399, which on the 'receive' path is coupled to a decryptor 366, and on a 'transmit' path is coupled to an encryptor 363, which are in turn coupled to a timing engine 370, which includes memory 372, a PTP response processor 374 and a PTP command processor 376. The protocol stack 370 used by PRE 10 may be, for example, a UDP protocol stack as defined in IEEE-1588 Standard, although alternative implementation of the protocol stack 399 could also be envisioned by those skilled in the art and are within the scope of the present invention. An output device or devices 380 may further be provided to output synchronization and network related information for the benefit of a user of the NMTS 5, such as the time-sync status summary for probes 20, and as further described hereinbelow. The output device 380 may be in the form of a computer display, a printer, a network card, and the like. A hardware clock 333 coupled to NIC 355, with an associated timing device driver 330, are further provided for providing accurate time stamps for packet reception and transmission by NIC 355 in accordance with the 1588 Standard.

Aspects of operation of PRE 10 that relate to the network timing synchronization will now be described with reference to FIG. 9 and also to FIGS. 3 and 5. In operation, the PTP command processor 316 in the timing engine 310 generates PTP commands, such as Sync or Follow_UpDelay_Resp commands, and forms timing messages such as Sync and Follow_UpDelay_Resp messages 111, 127 adding thereto corresponding timing information, for example as described hereinabove with reference to FIG. 5. Note that in the context of the present specification the term 'PTP command' encompasses timing commands according to embodiments of the present invention. The timing messages generated by the timing engine 310 are then passed to the encryptor 311, which encrypts them using a selected encryption algorithm such as for example Grain 128. Encrypted timing messages are then passed as the encrypted PTP payload 312 to the UDP stack 399, which adds thereto Probe, UDP and IP headers; the Ethernet layer (MAC header) may also be added. The UDP stack 399 outputs a timing packet 315 having encrypted Sync or FDResp messages as their payload, and passes them to NIC 355 for transmitting to a designate probe or probes 20 over the user network 12. For packets carrying Sync messages, as in the conventional PTP process, the timing device driver 330 reads the time of the packet transmission by NIC 355 from the hardware clock 333, and saves this time in memory 372, to be included in the payload of the Follow_UpDelay_Resp message 127 of the same synchronization sequence or period.

Packets received by PRE 10 from network 12 are first forwarded by NIC 355 to the PRE protocol stack 399, which strips the packet from its headers, and forwards the packet payload to the decryptor 366, which implements the selected encryption algorithm for decrypting thereof. If the decrypted payload includes a PTP command identifying it as containing a timing message, it is passed to the timing engine 370. In one embodiment, when the Del_Req packet is received at NIC 355, the time instance $T_4$ of its reception at NIC 355 is read from HW Clock 333 and recorded in memory 372 by the timing device driver 330. In another embodiment, all received packets are time-stamped by NIC 355, so that $T_4$ is extracted from the incoming packet and stored in memory 372 by the PTP Response Processor 374, while the timing driver 330 only records down the time instances $T_1$ of the transmission of Sync messages 111. The PTP response processor 374 processes the received Del_Req message payload parsing information containing therein. The reception of a Delay_Req command signals the PTP command processor 376 to generate a Follow_upDelay_Resp message 127 containing the time of transmission of the corresponding Sync packet $T_1$ and the time of the Del_Req packet reception $T_4$, which have been stored in memory 372.

As known in the art, the user network 12 may employ additional networking protocols 350, such as MPLS, VLAN, GRE, Ethernet, etc, to further encapsulate the timing packets 315. Although schematically shown as a single block in FIG. 9, different protocols may be used by different network equipment. Since probes 20 associated with PRE 10 may be incorporated at different location in the network in a variety of network equipment, timing packets reaching the probes 20 may have passed through different protocol stacks and acquire a variety of encapsulations and headers. Therefore, according to an aspect of the present invention, a probe 20 that operates as a slave to PRE 10 may be configured to automatically detect the protocol stack of each received PTP/timing packet, and to format the response packet in such a way that it can be routed back to the PRE 10.

Turning now to FIG. 10, there is illustrated a timing synchronization subsystem of probe 20 with an automatic protocol stack detection in accordance with an embodiment of the present invention. Various implementation of probe 20 may include other features and functionalities related to its operation as a network testing and monitoring element, including collecting network and/or equipment related performance information at a particular point in the network; various such features and functionalities are known in the art and are not described hereinbelow. In the context of timing synchronization within NMTS 5, probe 20 operates as a slave device and is also referred herein as the slave 20, with its internal clock 435 operating as a slave clock to the 'master' clock 333 in PRE 10 of FIG. 9. In the illustrated embodiment, main functionalities of the timing sync subsystem of probe 20 are implemented within an ASIC for the purposes of miniaturization, although those skilled in the art will appreciate that in other embodiments the same functionalities may also be embodied using different types of digital processors and computer equipment such as but not exclusively general purpose processors, specialized microprocessors. DSP, FPGA, or any combination thereof, and also using network cards and various memory devices.

As illustrated, probe 20 includes a packet send/receive unit 425, which serves as an interface to the user network 12 and may implement such functionalities as message queuing and searching for a gap for packet injection during transmitting, a PTP command processor 410, encryptor 489, decryptor 499, a protocol stack detector (PSD) 444, a probe command processor 422, clock 435, and a time stamp unit 430. The PTP command processor 410 includes timing memory 412 and a servo controller 413, also referred to herein simply as servo. The servo 413 implements a control loop for controlling and adjusting the clock 435 to minimize the time offset between the slave clock 435 at probe 20 and the master clock 333 at PRE 10 based on the timing values $T_1$, $T_2$, $T_3$ and $T_4$. Various practical implementations of the servo 413 are known in the art and will not be described herein.

In operation, packets received by Probe 10 are forwarded by the interface unit 425 to the protocol stack detector 444, which automatically detects the protocol stack encapsulating each received packet and strips the associated headers from the received packet. The encapsulating protocol stack may vary from one probe 20 to another in dependence on their location in the network. For example, in the illustrative example of FIG. 1, probe 20-1 that is shown as located within the network cloud, may have to handle different protocol stacks than probe 20-2 located at the network periphery. Furthermore, protocol stacks seen by a particular probe may also change, for example due to network reconfiguration. Accordingly, in one preferred embodiment probe 20 of FIG. 10 supports a plurality of protocol layers and encapsulation formats that maybe used by the user network 12, and is capable of automatically detecting the protocol stack of the incoming timing packets, and of formatting encapsulation layers of the response packet carrying Delay Request message according to the protocol stack detected during the reception of the corresponding Sync packet.

Table 1 summarizes, for one exemplary embodiment of the invention, supported upper stacks that can run on top of the lower stack immediately below them. Here 'supported' means detectable by the encapsulation detection block 444 in the exemplary embodiment. The 'time sync', or PTP, payload is carried in the uppermost UDP layer. In Table 1, each row corresponds to a lower stack, and each column corresponds to an upper stack. 'IP' in the table can be IPv4 or IPv6, VLAN can be single or stacked, and MPLS can be single or stacked, unicast or multicast. MAC in the table means Ethernet.

library of network-supported protocols 465 and generates therefrom an adaptive protocol stack 491 corresponding to the detected protocol stack of the received Sync packet. The Del_Req message 115 generated by PTP command processor 410 in response to the received Sync command is then passed through the encryptor 489 and the adaptive protocol stack 491 to generate a suitably encapsulated packet with the Del_Req message 115 in the encrypted payload; this packet is then transmitted by means of the interface unit 425 to PRE 10 over the network 12.

Measuring One-Way Latency

As described hereinabove, in the process of synchronizing their clocks to the 'master' PRE, probes 20 compute path delays D associated with the travel of the timing packets between the master and the slave. These time delays are used by the probe clock servo 413 to compute the slave clock offset O and to adjust the (time of) slave clock 435; they are generally not required at PRE 10 for the timing synchronization purposes and are internal parameters of the PTP process that are normally not available to a user of the network. However, in accordance with an aspect of the present invention, these time delays D are communicated back to PRE 10, for example in the body of the Del_Req message 115, and are used for measuring one-way latency between the PRE 10 and the probes 20 in the network. By collecting the path delay values D from a plurality of probes

TABLE 1

|       | MAC | VLAN | MPLS | GRE | PPPoE | PPP | IP | UDP | Payload |
|-------|-----|------|------|-----|-------|-----|----|-----|---------|
| MAC   |     | X    | X    |     | X     |     | X  |     |         |
| VLAN  |     |      | X    |     | X     |     | X  |     |         |
| MPLS  | X   |      |      |     |       |     | X  |     |         |
| GRE   |     | X    | X    |     |       |     | X  |     |         |
| PPPoE |     |      |      |     |       | X   |    |     |         |
| PPP   |     |      | X    |     |       |     | X  |     |         |
| IP    |     |      | X    | X   |       |     |    | X   |         |
| UDP   |     |      |      |     |       |     |    |     | X       |

By way of example, the following is a non-exclusive list of some of the encapsulation stacks that are supported, i.e. recognizable by probe 20, in this exemplary embodiment: MAC/IP/UDP/Payload; MAC/VLAN/IP/UDP/Payload; MAC/Stacked VLAN/IP/UDP/Payload; MAC/PPPoE/PPP/IP/UDP/Payload; MAC/MPLS/IP/UDP/Payload; MAC/IP/GRE/MPLS/MAC/IP/UDP/Payload.

Referring again to FIG. 10, from PSD 444, packet payloads are passed to a probe command processor 420, which parses the decrypted payload for probe commands and related data, and passes PTP commands and related timing data to the PTP command processor 410. Depending on the received PTP command. PTP command processor 410 may generate a response message such as Del_Req message, and/or extract the timing data such as $T_1$ and $T_4$ in the FollowUpDelResp message, saving them in memory 412. Time instances $T_2$ and $T_3$ when timing packets are received or transmitted by the probe 10 are also recorded in memory 412 by time stamp unit (TSU) 430 in cooperation with a hardware clock 435.

When a timing packet with a Sync message 111, i.e. Sync packet, is received by Probe 20, a response packet with the Del_Req message 115 must utilize the same protocol stack, with appropriate sequence identifiers, in order to be forwarded by the network 12 to the correct PRE 10. Accordingly, in one embodiment PSD 444 provides information about the detected protocol stack for the received Sync packet to a protocol stack assembler 460, which supports a 20 distributed throughout the network, PRE 10 can assemble and maintain a database of network latency values, which can be then presented to a user with the output device 380, together with some identifiers of the location of the respective probes in the network. When some of the probes 20 are sequentially located in the network 12, so that timing packets have to travel sequentially through a one or more other probes in their way to and from PRE 10, path delay values D obtained for such probes can be used for network segmentation and for determining network latencies in segments of network between the serially located probes. By way of example, dashed arrows in FIG. 1 illustrate serially located probes 10-1 and 20-2, when timing packets exchanged between probe 20-2 and PRE 10 must travel through probe 20-1. In this case, when PRE 10 receives path delay values D1 and D2 from probes 20-1 and 20-2, it can compute a network latency for a network segment between probes 20-1 and 20-2, using the path delay difference D12=D2−D1.

In one embodiment, the symmetrical path delay D, as defined by equations (3) and (4), is presented as the one-way network latency value between the PRE 10 and a corresponding probe 20 at which D was computed. In one embodiment, suitable correction values can be added to the symmetrical path delay D to separately compute, and present to the user, the one-way latency values from the master 10 to slave 20 (M2S) and/or from the slave 20 to master 10

(S2M), to take into account possible asymmetries in a packet travel time from the master to slave and back.

Accordingly, one aspect of the present invention provides a method for time synchronization between a master device such as PRE 10 and a plurality of slave devices spaced in a network, such as probes 20, in NMTS 5, which includes the following general steps:

a) sending by the master device 10 a Sync message 111 to each of the slave devices 20, and recording a time instant $T_1$ when the Sync message 111 leaves the master device 10, and time instances T2 when each of the slave devices 20 receives the Sync message;

b) sending by each of the slaves 20 to the master 10 a Delay request (Del_Req) message 115, and recording time instances $T_3$ at which the Del_Req messages 115 leave the slave devices, and time instances $T_4$ at which the Del_Req messages 115 are received by the master device;

c) communicating values of $T_4$ and $T_1$ to the respective slave devices 20;

d) computing at each of the slave devices 20 a slave device clock offset 'O' and a network path delay 'D' based on $T_1$, $T_2$, $T_3$ and $T_4$;

e) communicating to the master device 10 the network delay values D computed at each of the slave devices 20; and, f) outputting one or more of the network delay values D in association with network location identifiers for respective one or more slave devices 20 and the master device 10 to a user as network latency values.

Steps (a)-(d) may be iteratively repeated at prescribed time intervals to form an iterative clock synchronization process that adaptively adjusts the slave clocks to minimize their offset from the master clock, for example similarly as the sending of timing messages is periodically repeated and the slave clocks are adjusted in the conventional PTP process. In one embodiment, the network delay values D computed by the slaves at each, or each N-th, iteration of this iterative synchronization process, where the positive integer N can be user-selectable, are communicated to the master device in step (c) with the Delay Request messages transmitted at a subsequent iteration of the iterative synchronization process. These time-stamped path delay values can be stored in memory at the master device, e.g. PRE 10, and a historical record thereof may be provided to the user of the NMTS 5.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

We claim:

1. A routing device comprising:
a memory to store instructions; and
a processor to execute the instructions to:
transmit, to a network probe device, a Sync message at a first time;
record, based on transmitting the Sync message, a first time value associated with the first time,
the network probe device receiving the Sync message at a second time associated with a second time value;
receive, from the network probe device, a Delay request message,
the network probe device transmitting the Delay request message at a third time associated with a third time value, and
the Delay request message being received at a fourth time;
record, based on receiving the Delay request message, a fourth time value associated with the fourth time;
transmit, to the network probe device, a Follow up Delay response message,
the Follow up Delay response message including the first time value and the fourth time value,
the network probe device computing, based on the first time value, the second time value, the third time value, and the fourth time value, an offset time value that is used to synchronize the routing device and the network probe device, and
at least one of the Sync message, the Delay request message, or the Follow up Delay response message being encrypted;
receive the offset time value from the network probe device; and
output the offset time value in association with a network location identifier for the network probe device.

2. The routing device of claim 1, where the processor stores the first time value.

3. The routing device of claim 1, where the first time value is different from the second time value.

4. The routing device of claim 1, where the first time value, the second time value, the third time value, and the fourth time value are used to compute an amount of delay associated with a network that includes the routing device and the network probe device.

5. The routing device of claim 1, where the offset time value is used to adjust a clock associated with the network probe device.

6. The routing device of claim 1, where the processor is further to:
transmit the Sync message to a plurality of network probe devices,
the plurality of network probe devices including the network probe device.

7. A method comprising:
transmitting, by a routing device and to a network probe device, a Sync message at a first time;
recording, by the routing device and based on transmitting the Sync message, a first time value associated with the first time,
the network probe device receiving the Sync message at a second time associated with a second time value;
receiving, by the routing device and from the network probe device, a Delay request message,
the network probe device transmitting the Delay request message at a third time associated with a third time value, and
the Delay request message being received at a fourth time;
recording, by the routing device and based on receiving the Delay request message, a fourth time value associated with the fourth time;
transmitting, by the routing device and to the network probe device, a Follow up Delay response message,
the Follow up Delay response message including the first time value and the fourth time value,
the network probe device computing, based on the first time value, the second time value, the third time value, and the fourth time value, an offset time value that is used to synchronize the routing device and the network probe device, and
at least one of the Sync message, the Delay request message, or the Follow up Delay response message being encrypted;
receiving, by the routing device, the offset time value from the network probe device; and
outputting, by the routing device, the offset time value in association with a network location identifier for the network probe device.

8. The method of claim 7, further comprising:
storing the first time value.

9. The method of claim 7, where the first time value is different from the second time value.

10. The method of claim 7, where the first time value, the second time value, the third time value, and the fourth time value are used to compute an amount of delay associated with a network that includes the routing device and the network probe device.

11. The method of claim 7, where the offset time value is used to adjust a clock associated with the network probe device.

12. The method of claim 7, further comprising:
transmitting the Sync message to a plurality of network probe devices,
the plurality of network probe devices including the network probe device.

13. A network probe device comprising:
a memory to store instructions; and
a processor to execute the instructions to:
receive, from a routing device, a Sync message,
the Sync message being transmitted at a first time associated with a first time value
the Sync message being received at a second time;
record, based on receiving the Sync message, a second time value associated with the second time;
transmit, to the routing device, a Delay request message at a third time,
the Delay request message being received by the routing device at a fourth time associated with a fourth time value;
record, based on transmitting the Delay request message, a third time value associated with the third time;
receive, from the routing device, a Follow up Delay response message,
the Follow up Delay response message including the first time value and the fourth time value;
compute, based on the first time value, the second time value, the third time value, and the fourth time value, an offset time value that is used to synchronize the routing device and the network probe device,
at least one of the Sync message, the Delay request message, or the Follow up Delay response message being encrypted; and
transmit the offset time value to the routing device,
the routing device outputting the offset time value in association with a network location identifier for the network probe device.

14. The network probe device of claim 13, where the processor synchronizes, using the offset time value, the network probe device and the routing device.

15. The network probe device of claim 14, where the processor, when synchronizing the network probe device and the routing device, is to:
synchronize the network probe device and the routing device by adjusting a clock associated with the network prove device.

16. The network probe device of claim 13, where the processor is further to:
compute, using the first time value, the second time value, the third time value, and the fourth time value, an amount of delay associated with a network that includes the network probe device and the routing device.

17. The network probe device of claim 13, where each of the first time value, the second time value, the third time value, and the fourth time value is different from each other.

18. The routing device of claim 1, where the Sync message, the Delay request message, or the Follow up Delay response message is encrypted using at least one of:
a Grain-128 encryption,
a Rivest Cipher 4 (RC4) encryption,
a Galois/Counter Mode encryption,
a Counter with cipher block chaining message authentication code (CBC-MAC) encryption,
an encrypt-then-authenticate-then-translate (EAX) encryption, or
an Offset Codebook Mode encryption.

19. The method of claim 7, where the Sync message, the Delay request message, or the Follow up Delay response message is encrypted using at least one of:
a Grain-128 encryption,
a Rivest Cipher 4 (RC4) encryption,
a Galois/Counter Mode encryption,
a Counter with cipher block chaining message authentication code (CBC-MAC) encryption,
an encrypt-then-authenticate-then-translate (EAX) encryption, or
an Offset Codebook Mode encryption.

20. The network probe device of claim 13, where the Sync message, the Delay request message, or the Follow up Delay response message is encrypted using at least one of:
a Grain-128 encryption,
a Rivest Cipher 4 (RC4) encryption,
a Galois/Counter Mode encryption,
a Counter with cipher block chaining message authentication code (CBC-MAC) encryption,
an encrypt-then-authenticate-then-translate (EAX) encryption, or
an Offset Codebook Mode encryption.

* * * * *